United States Patent
Kwon

(10) Patent No.: US 9,041,956 B2
(45) Date of Patent: May 26, 2015

(54) IMAGE FORMING APPARATUS SUPPORTING PLURALITY OF NETWORK INTERFACES AND METHOD OF EDITING ROUTING TABLE THEREOF

(75) Inventor: Yong-won Kwon, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 173 days.

(21) Appl. No.: 13/531,988

(22) Filed: Jun. 25, 2012

(65) Prior Publication Data

US 2013/0107316 A1     May 2, 2013

(30) Foreign Application Priority Data

Oct. 28, 2011    (KR) ................. 10-2011-0111410

(51) Int. Cl.
 - *G06F 3/12* (2006.01)
 - *H04L 12/741* (2013.01)
 - *G06K 15/00* (2006.01)

(52) U.S. Cl.
 CPC ...................... *H04L 45/54* (2013.01)

(58) Field of Classification Search
 CPC .................. G06F 3/1201; H04N 1/32416
 See application file for complete search history.

(56) References Cited

U.S. PATENT DOCUMENTS

| | | | |
|---|---|---|---|
| 2004/0133689 A1 | 7/2004 | Vasisht | |
| 2007/0002359 A1 | 1/2007 | Sergey | |
| 2007/0279666 A1* | 12/2007 | Lee et al. | 358/1.13 |
| 2008/0140812 A1 | 6/2008 | Chang | |
| 2011/0080910 A1* | 4/2011 | Shouno | 370/390 |
| 2011/0134452 A1 | 6/2011 | Kim et al. | |
| 2013/0110995 A1* | 5/2013 | Kwon | 709/221 |

FOREIGN PATENT DOCUMENTS

KR    10-2007-0079702      8/2007

OTHER PUBLICATIONS

International Search Report and Written Opinion of the International Searching Authority mailed Dec. 14, 2012 in corresponding International Patent Application No. PCT/KR2012/004916.

Extended European Search Report issued Feb. 18, 2013, in corresponding European Patent Application No. 12179811.0.

\* cited by examiner

*Primary Examiner* — Dov Popovici

(74) *Attorney, Agent, or Firm* — Staas & Halsey LLP

(57) ABSTRACT

An image forming apparatus and a method of editing a routing table are provided. The image forming apparatus includes a user interface to receive a user request for a change in network settings between a plurality of network interfaces defined in a routing table and networks, a routing table management unit to edit the defined network settings based on the received user request, and a storage to store the routing table.

20 Claims, 7 Drawing Sheets

FIG. 3A

```
Routing Table                                                              ↻
─────────────────────────────────────────────────────────────────────────
Selected:0  | Total:3 (MAX:100)   Ping  [128.168.10.10]     [Test]
[Add] [Delete] [Default Gateway]
─────────────────────────────────────────────────────────────────────────
  □  |  Destination↑   |     Gateway      |    Interface    |
  □     192.1.10.0         192.1.10.1          eth0
  □     192.1.20.0         192.1.20.1          wireless0
  □     default            192.1.10.1          eth0
```

302 — Total:3 (MAX:100)
304 — Default Gateway
305 — 128.168.10.10
303 — Add / Delete / Default Gateway
301 — (table rows)

FIG. 3B

```
ADDITION                                                              [×]

[Apply]  [Undo]  [Cancel]

IP VERSION ─────────────────────────────────────────────────────

◉ IPv4 ADDRESS              ◎ IPv6 ADDRESS

ADDRESS TYPE ───────────────────────────────────────────────────

◉ Network Address           ◎ Host Address

Route Table Entry ──────────────────────────────────────────────

IPv4 ADDRESS:          [128.168.10.0]

SUBNET MASK:           [255.255.255.0]

GATEWAY ADDRESS:       [192.1.20.1]
```

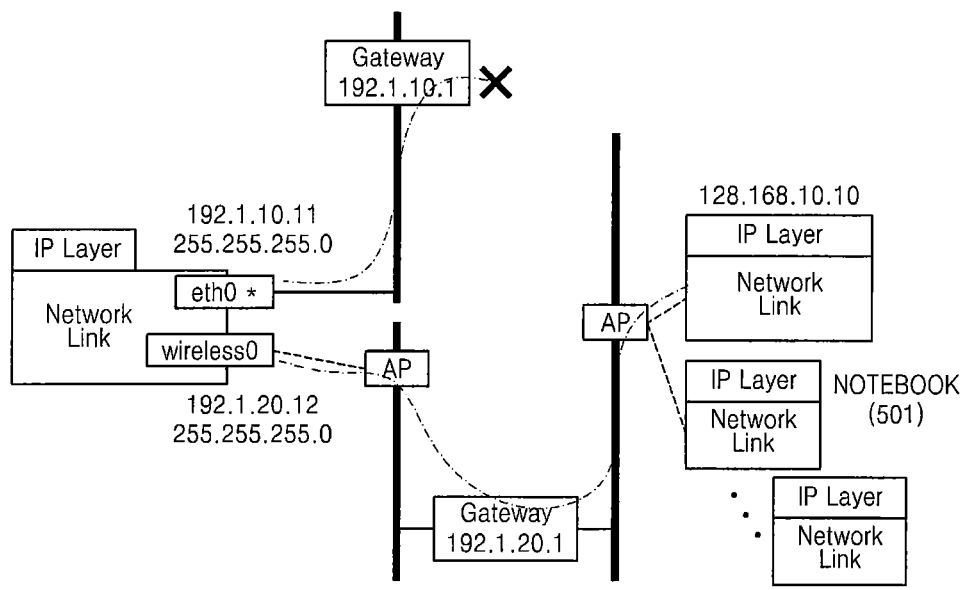

| | Destination↑ | Gateway | Interface |
|---|---|---|---|
| ☐ | 128.168.10.10 | 192.1.20.1 | wireless0 |
| ☐ | 192.1.10.0 | 192.1.10.1 | eth0 |
| ☐ | 192.1.20.0 | 192.1.20.1 | wireless0 |
| ☐ | default | 192.1.10.1 | eth0 |

Routing Table — Selected:0 | Total:3 (MAX:100) — Ping [ ] Test — Add | Delete | Default Gateway — 701

IMAGE FORMING APPARATUS SUPPORTING PLURALITY OF NETWORK INTERFACES AND METHOD OF EDITING ROUTING TABLE THEREOF

CROSS-REFERENCE TO RELATED APPLICATIONS

This application claims the priority benefit of Korean Patent Application No. 10-2011-0111410, filed on Oct. 28, 2011, in the Korean Intellectual Property Office, the disclosure of which is incorporated herein in its entirety by reference.

BACKGROUND

1. Field

The following description relates to an image forming apparatus supporting a plurality of network interfaces and a method of editing a routing table in the image forming apparatus.

2. Description of the Related Art

Image forming apparatuses include devices such as printers, scanners, copiers, facsimiles, and multi-function products (MFP) integrating functions of these devices. These image forming apparatuses support a function of transmitting a printed and scanned document over a network by using a network interface. Thus, image forming apparatuses having a transmission function include network interfaces connectible to a wired or wireless network.

SUMMARY

Additional aspects and/or advantages will be set forth in part in the description which follows and, in part, will be apparent from the description, or may be learned by practice of the invention.

The following description relates to an image forming apparatus supporting a plurality of network interfaces and a method of editing a routing table in the image forming apparatus. The present general inventive concept is not limited thereto, and other general inventive concepts may exist.

According to an aspect, there is provided an image forming apparatus to manage network connections to a plurality of network interfaces by using a routing table, the image forming apparatus including: a user interface to receive a user request for a change in network settings between the plurality of network interfaces defined in the routing table and networks; a routing table management unit to edit the defined network settings based on the received user request; a storage unit to renew and store the routing table based on the edited network settings.

According to another aspect, there is provided an image forming apparatus to manage network connections to a plurality of network interfaces by using a routing table, the image forming apparatus including: a user interface to display network settings between the plurality of network interfaces defined in the routing table and networks, and receive a user request for a network address to be added to the routing table; a routing table management unit to edit the defined network settings based on a result obtained by attempting a connection to the network address through the plurality of network interfaces; a storage unit to update and store the routing table based on the edited network settings.

According to another aspect, there is provided a method of editing a routing table managing network connections to a plurality of network interfaces of an image forming apparatus, the method including: receiving a user request for a change in network settings between the plurality of network interfaces defined in the routing table and networks; editing the defined network settings based on the received user request; and updating the routing table based on the edited network settings.

According to another aspect, there is provided a method of editing a routing table managing network connections to a plurality of network interfaces of an image forming apparatus, the method including: displaying network settings between the plurality of network interfaces defined in the routing table and networks; receiving a user request for a network address to be added to the routing table; editing the defined network settings based on a result obtained by attempting a connection to the network address through the plurality of network interfaces; and updating and storing the routing table based on the edited network settings.

According to another aspect, there is provided an image forming apparatus to manage network connections to a plurality of network interfaces by using a routing table, the image forming apparatus including: a storage unit to store network settings between the plurality of network interfaces defined in the routing table and networks; and a user interface to display a screen regarding the stored network settings and a screen to perform at least one operation of correction, deletion, and addition operations on the network settings.

BRIEF DESCRIPTION OF THE DRAWINGS

The above and other features and advantages of the present general inventive concept will become more apparent by describing in detail exemplary embodiments thereof with reference to the attached drawings in which:

FIG. 3A illustrates network settings included in a routing table displayed on a user interface according to an embodiment;

FIG. 3B illustrates a screen in which an additional network address is input to a routing table through a user interface according to an embodiment;

FIG. 5 is a diagram for explaining a process of acquiring a network route in a route acquisition unit according to an embodiment;

FIG. 6 illustrates a screen in which a network route acquired by a route acquisition unit is selected through a user interface according to an embodiment;

DETAILED DESCRIPTION

Figure 1A:
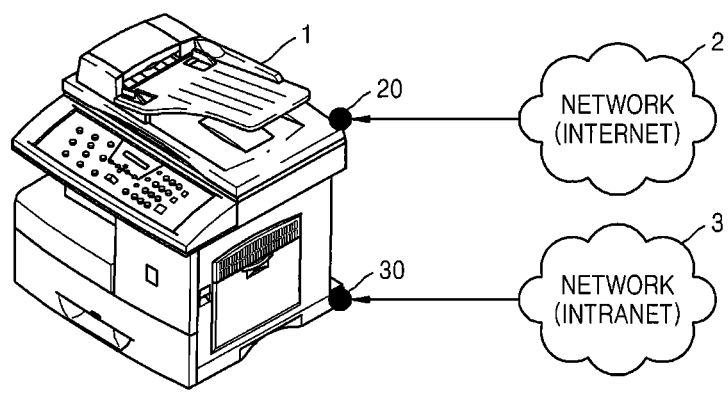
FIGS. 1A and 1B illustrate an image forming apparatus according to an embodiment.

Reference will now be made in detail to the embodiments, examples of which are illustrated in the accompanying drawings, wherein like reference numerals refer to like elements throughout. The embodiments are described below to explain the present invention by referring to the figures.

The present general inventive concept will now be described more fully with reference to the accompanying drawings, in which exemplary embodiments are shown. Expressions such as "at least one of," when preceding a list of elements, modify the entire list of elements and do not modify the individual elements of the list.

Figure 1B:
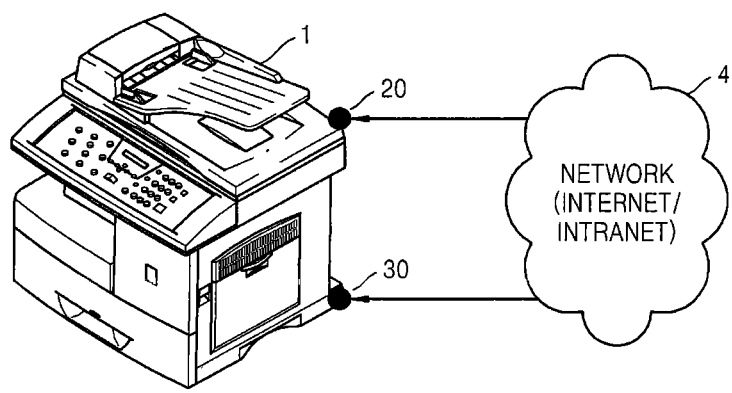

FIGS. 1A and 1B illustrate an image forming apparatus 1 according to an embodiment. Referring to FIGS. 1A and 1B, the image forming apparatus 1 is connected to at least one network 2, 3, or 4 by a wired or wireless connection by using first and second network interfaces 20 and 30, and includes a general multi-function product (MFP) supporting at least one function of copying, fax transmission and reception, printing, email transfer, file transfer to a server, and scanning. The image forming apparatus 1 will be described as the MFP in the embodiments below but the present general inventive concept is not limited thereto and the image forming apparatus 1 may be an individual apparatus such as a printer, scanner, or facsimile machine, for example.

The image forming apparatus 1 includes the network interfaces 20 and 30. For example, the first network interface 20 may be connected to the network 2 or 4 by a wired connection, and the second network interface 30 may be connected to the network 3 or 4 by a wireless connection, but the present general inventive concept is not limited thereto. The first and second network interfaces 20 and 30 may be manufactured as on-board network interfaces or network card network interfaces. Furthermore, the first and second network interfaces 20 and 30 may be manufactured on one network board.

In the present embodiment, the first and second network interfaces 20 and 30 use different hardware addresses, for example, media access control (MAC) addresses, and different software addresses, for example, Internet protocol (IP) addresses. A MAC address is a hardware address of an Ethernet card that is a type of a network interface card and is written in a read only memory (ROM) of the Ethernet card. As such, since the first and second network interfaces 20 and 30 use MAC addresses, although one of the first and second network interfaces 20 and 30 is performing a network operation, the other one may also simultaneously perform the network operation.

For reference, although the image forming apparatus 1 includes the two first and second network interfaces 20 and 30 in FIGS. 1A and 1B, those of ordinary skill in the art would understand that two or more network interfaces may be included in the image forming apparatus 1.

Referring to FIG. 1A, the first network interface 20 included in the image forming apparatus 1 is connected to the network 2 such as the Internet by a wired connection and transmits and receives data. The second network interface 30 is connected to the network 3 such as an Intranet by a wireless connection and transmits and receives data. That is, the first and second network interfaces 20 and 30 of the image forming apparatus 1 shown in FIG. 1A are respectively connected to the networks 2 and 3 that are separated from each other.

Referring to FIG. 1B, the first network interface 20 included in the image forming apparatus 1 is connected to the network 4 by a wired connection and transmits and receives data. The second network interface 30 is connected to the network 4 by a wireless connection and transmits and receives data. That is, the first and second network interfaces 20 and 30 of the image forming apparatus 1 shown in FIG. 1B are connected to the network 4 for Internet or Intranet connectivity.

The image forming apparatus 1 shown in FIG. 1A is connected to the different networks 2 and 3 by using the different first and second network interfaces 20 and 30, and thus a routing table stored in the image forming apparatus 1 needs to be appropriately managed. However, the image forming apparatus 1 shown in FIG. 1B is connected to the same network 4 by using the different first and second network interfaces 20 and 30 and thus can be connected to the networks 2 and 3 using initial network settings although an additional network setting is not input into the routing table.

More specifically, for general connectivity to the network 4, network settings such as an IP address, a subnet, and a gateway address with respect to the first and second network interfaces 20 and 30 are defined in a routing table. For example, if the IP address is 192.10.1.10, the subnet is 255.255.255.0, and the gateway address is 192.10.1.1, the first or second network interface 20 or 30 is connected to the network 4 of 192.10.1. Thus, the first or second network interface 20 or 30 can be connected to all IP addresses starting with 192.10.1.

However, generally the routing table may not include information about another network route. For example, the routing table may not define a network route with respect to an IP address that does not belong to 192.10.1. If the IP address that does not belong to 192.10.1, for example, 128.168.10, is a destination, the first or second network interface 20 or 30 attempts connection through a default gateway defined in the routing table. However, if the default gateway connectible to 128.168.10 is not defined in the routing table, the first or second network interface 20 or 30 cannot be connected to an IP address of 128.168.10.10 even though the first or second network interface 20 or 30 is designated as the default gateway, because the first network interface 20 is not physically connected to the IP address of 128.168.10.10 by the routing table.

Therefore, the first or second network interface 20 or 30 corresponding to the default gateway can be connected to a specific network route only when information about the network route is defined in the routing table.

Conventionally, if the image forming apparatus 1 includes the first and second network interfaces 20 and 30, the image forming apparatus does not provide a user with a function of managing the routing table for network settings conveniently. In particular, since it is not easy for the user to edit the routing table, the user needs a professional network manager's help in order to connect the first and second network interfaces 20 and 30 to other desired networks.

However, the image forming apparatus 1 according to the present embodiment provides a user with a function of intuitively editing the routing table more easily, thereby more easily managing network connections of the first and second network interfaces 20 and 30 included in the image forming apparatus 1. The construction and operation of the image forming apparatus 1 of the present embodiment will now be described in more detail below.

Figure 2:
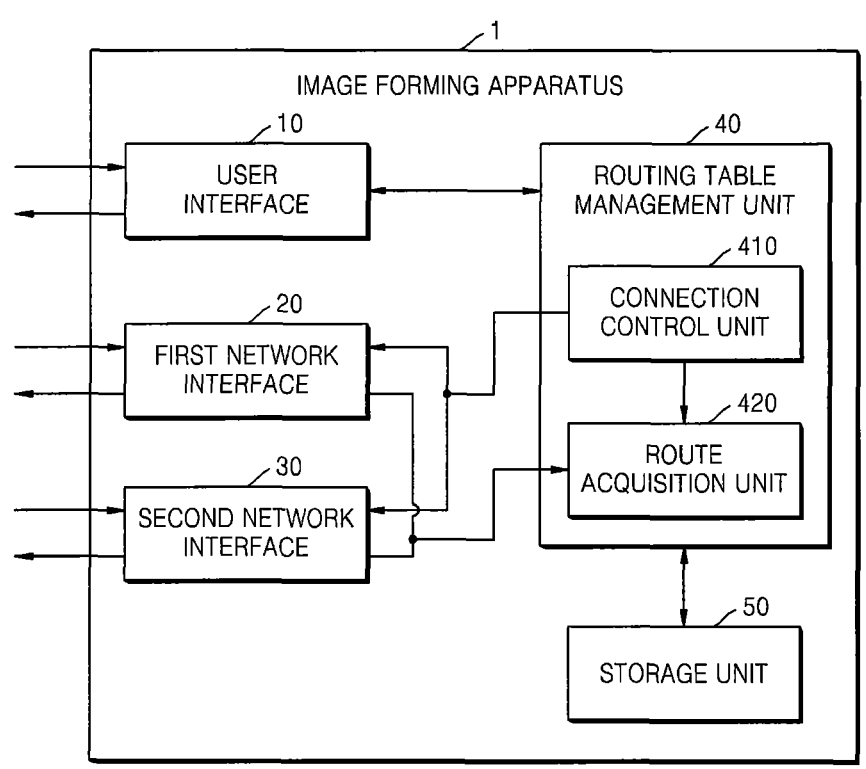
FIG. 2 is a block diagram of an image forming apparatus according to an embodiment.

FIG. 2 is a block diagram of the image forming apparatus 1 according to an embodiment of the present general inventive concept.

Referring to FIG. 2, the image forming apparatus 1 includes a user interface 10, the first network interface 20, the second network interface 30, a routing table management unit 40, and a storage unit 50. In this regard, the routing table management unit 40 includes a connection control unit 410 and a route acquisition unit 420.

The routing table management unit 40 may correspond to a type of processor. Thus, the routing table management unit 40 may be implemented with an array of a plurality of logic gates or a combination of a general purpose microprocessor and a memory storing therein a program executable in the general purpose microprocessor. In addition, those of ordinary skill in the art will understand that the routing table management unit 40 may be implemented using a type of hardware.

The image forming apparatus 1 shown in FIG. 2 includes the elements relating to the present embodiment that may not blur the feature of the present embodiment. However, those of ordinary skill in the art will understand that the image forming apparatus 1 may further include general purpose elements in addition to the elements shown in FIG. 2.

The user interface 10 displays information about network settings included in a routing table stored in the image forming apparatus 1. In this regard, the user interface 10 displays the routing table by using a device (for example, a display, a liquid crystal display (LCD) screen, a light emitting diode (LED), a gradation display device, etc.) for displaying video information, and a device (for example, a speaker, etc.) for displaying audio information for a user display. Thus, the user can intuitively recognize the network settings of the routing table currently stored in the image forming apparatus 1.

The user interface 10 receives a user request to change the network settings between the first and second network interfaces 20 and 30 defined in the displayed routing table and the networks 2, 3 of FIG. 1A or 4 of FIG. 1B. In this regard, the user interface 10 receives the user request by using devices and methods for inputting information such as a keyboard, a mouse, a touch screen, or speech recognition, for example.

That is, the user interface 10 of the image forming apparatus 1 corresponds to a local user interface (UI).

FIG. 3A illustrates network settings 301 included in a routing table displayed on the user interface 10 according to an embodiment.

Referring to FIG. 3A, the user interface 10 displays the network settings 301 regarding destinations, gateways, and the first and second network interfaces 20 and 30 currently defined by the routing table.

That is, FIG. 3A shows a subnet connectible to the gateways designated in the first and second network interfaces 20 and 30. For example, for communication with a host starting with a gateway of 192.1.10, the host can be connected through a network interface 'eth0', and for communication with a host starting with a gateway of 192.1.20, the host can be connected through a network interface 'wireless0'. A default item indicates through the routing table that the network interface 'eth0' is used in a currently unknown destination. In this regard, the network interface eth0 corresponds to the first network interface 20, and the network interface 'wireless0' corresponds to the second network interface 30.

The user interface 10 may further display a delete button 302, an add button 303, and a default gateway button 304 to provide a function of editing the routing table.

The user may delete the current network settings 301 included in the routing table by clicking the delete button 302 displayed on the user interface 10. The user may also change or correct the default gateway of the current network settings 301 included in the routing table by clicking the default gateway button 304 displayed on the user interface 10.

The user may also easily perform a ping test on a specific network address by inputting the specific network address in a ping test box 305 displayed on the user interface 10.

Furthermore, the user may add a new network setting to the routing table by clicking the add button 303 displayed on the user interface 10.

FIG. 3B illustrates a screen in which an additional network address is input to a routing table through the user interface 10 according to an embodiment.

Referring to FIG. 3B, a user may input IP address information about an IP address to be added to the routing table through a network setting addition screen displayed on the user interface 10. The screen displayed on the user interface 10 shown in FIG. 3B may be used when the user is exactly informed of a network address to be added. That is, if the network address is input through the screen displayed on the user interface 10 shown in FIG. 3B, a connection test such as a ping test may be skipped and the input network address may be directly added to the routing table.

Figure 3C:
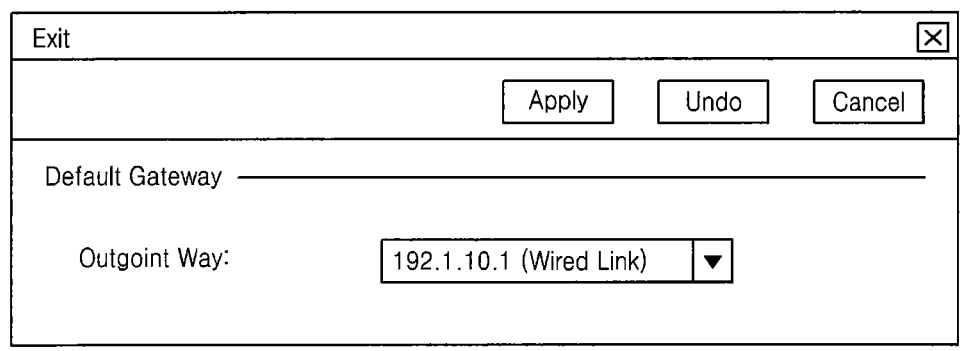
FIG. 3C illustrates a screen in which a default gateway defined in a routing table is changed through a user interface according to an embodiment.

FIG. 3C illustrates a screen in which a default gateway defined in a routing table is changed through the user interface 10 according to an embodiment.

Referring to FIG. 3C, a user may correct a currently defined default gateway through a default gateway editing screen displayed on the user interface 10.

Referring to FIG. 2, the user request received from the user through the user interface 10 includes at least one of a request for a network address to be added to the routing table and a request for a network setting to be corrected or deleted with respect to the routing table.

If the user interface 10 receives the user request for the network address to be added to the routing table, the network address requested by the user includes information about at least one of an IP address, a port number, and a communication protocol.

For example, the user request may include the IP address only as the network address to be added to the routing table. Furthermore, if a network to be added is served in a transmission control protocol (TCP) as the IP address and the port number, the user request may include the IP address and the port number as the network address to be added to the routing table. Furthermore, if the network to be added is served in a protocol input as the IP address and the port number, the user request may include the IP address, the port number, and protocol information as the network address to be added to the routing table.

The routing table management unit 40 edits the network settings defined in the routing table based on the received user request.

If a request for a network setting to be corrected or deleted with respect to the routing table is received through the user interface 10, the routing table management unit 40 corrects or deletes the network setting requested by the user with respect to currently displayed network settings (301 of FIG. 3A) of the routing table.

For example, if the user desires to delete a destination address of 192.1.10.0 designated in 'eth0' in FIG. 3A, the routing table management unit 40 edits the network settings of the routing table to delete the destination address of 192.1.10.0 designated in 'eth0'. Alternatively, for example, if the user desires to designate 'wireless0' as the default gateway in the gateway of 192.1.20.1 of FIG. 3A, the routing table management unit 40 corrects the network settings of the routing table to designate 'wireless0' as the default gateway of 192.1.20.1.

However, if the user request for the network address to be added to the routing table is received through the user interface 10, the routing table management unit 40 operates as described below.

The routing table management unit 40 edits the network settings defined in the routing table by mapping a connectible network interface to the network address to be added among network interfaces. That is, the connectible network interface is defined as the default gateway corresponding to a network address.

More specifically, as described above, the routing table management unit 40 includes the connection control unit 410 and the route acquisition unit 420.

The connection control unit 410 attempts a connection to the network address to be added by using the first and second network interfaces 20 and 30. The connection control unit 410 attempts a connection to the network address to be added by using at least one of a ping test, a TCP/IP test, a connection test according to a traceroute command, and a connection test based on a communication protocol with respect to the first and second network interfaces 20 and 30.

As described above, the user may request for an IP address, the IP address and a port number, or the IP address, the port number, and protocol information as the network address to be added through the user interface 10. The connection control unit 410 attempts the following connections in cases of the three user requests.

Figure 4A:
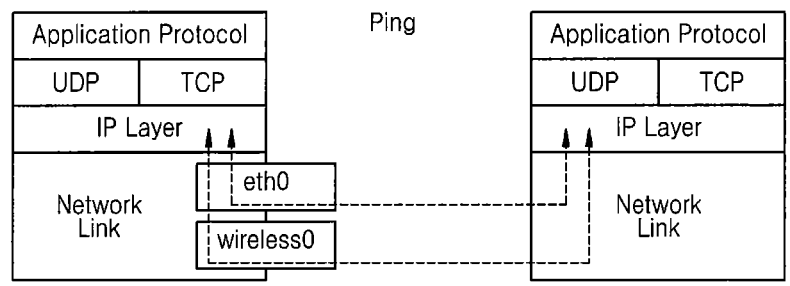
FIG. 4A is a diagram for explaining an operation of a connection control unit if a user request includes an Internet protocol (IP) address according to an embodiment.

FIG. 4A is a diagram for explaining an operation of the connection control unit 410 if a user request includes an IP address according to an embodiment.

Referring to FIG. 4A, if the user request includes the IP address, the connection control unit 410 performs a ping test to determine whether a packet can be transmitted to the IP address. That is, the connection control unit 410 controls the first and second network interfaces 20 and 30 to transmit an Echo request of an Internet control message protocol (ICMP) corresponding to the ping test and attempt a connection. If the first or second network interface 20 or 30 receives an Echo reply, the connection can be made to the IP address through the first or second network interface 20 or 30.

Figure 4B:
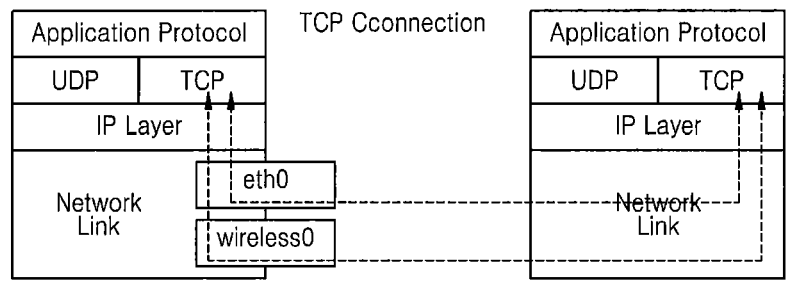
FIG. 4B is a diagram for explaining an operation of a connection control unit if a user request includes an IP address and a port number according to an embodiment.

FIG. 4B is a diagram for explaining an operation of the connection control unit 410 if a user request includes an IP address and a port number according to an embodiment.

Referring to FIG. 4B, if the user request includes the IP address and the port number, the connection control unit 410 controls the first and second network interfaces 20 and 30 to attempt a TCP/IP connection to the IP address and the port number. If the first or second network interface 20 or 30 succeeds in the TCP/IP connection, the connection can be made to the IP address through the first or second network interface 20 or 30. In this regard, if the image forming apparatus 1 has a Linux based operating system (OS), the connection control unit 410 may use a traceroute command, for example.

Figure 4C:
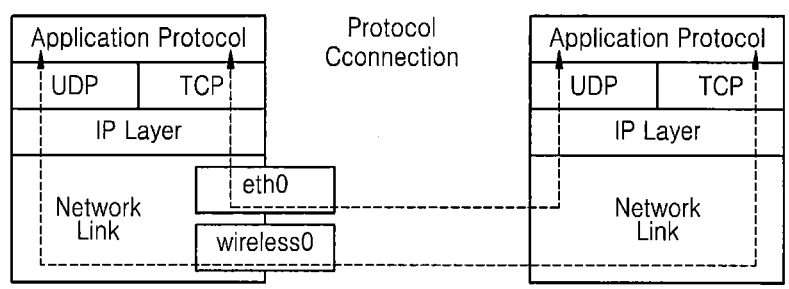
FIG. 4C is a diagram for explaining an operation of a connection control unit if a user request includes an IP address, a port number, and protocol information according to an embodiment.

FIG. 4C is a diagram for explaining an operation of the connection control unit 410 if a user request includes an IP address, a port number, and protocol information according to an embodiment.

Referring to FIG. 4C, if the user request includes the IP address, the port number, and the protocol information, the connection control unit 410 controls the first and second network interfaces 20 and 30 to transmit a packet to the protocol. If the first or second network interface 20 or 30 receives a reply to the transmitted packet, the connection can be made to the IP address through the first or second network interface 20 or 30. For example, if the user requests a simple network management protocol (SNMP), the connection control unit 410 transmits a SNMP Get Request to a 161 port of the IP address and then determines the first or second network interface 20 or 30 connectible to the IP address according to whether a SNMP reply is received.

Referring back to FIG. 2, the route acquisition unit 420 acquires information about a network route connectible to the network address to be added in the first and second network interface 20 and 30 based on the connection result of the connection control unit 410. The routing table management unit 40 edits the routing table based on the acquired information about the network route.

The route acquisition unit 420 acquires the following types of information about the network route according to the connection result of the connection control unit 410.

The route acquisition unit 420 may acquire the information about the network route only by using the IP address. For example, if the image forming apparatus 1 includes the first network interface 20 having a gateway of 192.168.1.1 and the second network interface having a gateway of 192.168.2.1, and the user request includes an IP address of 192.168.10.10, the connection control unit 410 performs a ping test on the IP address of 192.168.10.10 through the first and second network interface 20 and 30. If the connection control unit 410 succeeds in the ping test through the first network interface 20, the route acquisition unit 420 acquires a network route "192.168.10.10, 192.168.1.1, eth0".

Alternatively, the route acquisition unit 420 may acquire the information about the network route through a subnet corresponding to an IP class type of the IP address. Since the IP class type of 192.168.10.10 is a C class, the route acquisition unit 420 acquires a network route "192.168.10.0/24, 192.168.1.1, eth0".

Alternatively, the route acquisition unit 420 may acquire the information about the network route through a connection test on the IP class type of the IP address. For example, the route acquisition unit 420 may acquire information on a subnet of 192.168.10.10 based on a connection test result on 192.168.10.1 and 192.168.10.254 that belong to the C class in order to determine the subnet of 192.168.10.10. To test whether a large subnet is available, if a connection can be made based on a connection test result regarding one of 192.168.14.1~192.168.14.254, the route acquisition unit 420 acquires a network route "192.168.8.0/21, 192.168.1.1, eth0". As described above, the route acquisition unit 420 may acquire more network routes based on the connection test result of the connection control unit 410 regarding optional IP addresses neighboring the IP address.

Alternatively, the route acquisition unit 420 may acquire the information about the network route when the traceroute command is used. For example, if the connection control unit 410 attempts the TCP/IP connection to the IP address and the port number, the connection control unit 410 further uses the traceroute command. Accordingly, the route acquisition unit 420 additionally acquires a gateway to which a packet is transmitted. The route acquisition unit 420 may acquire the information about the network route by calculating a network address including an additional gateway address and the IP address by using the additional gateway address and the IP address. In this regard, the route acquisition unit 420 may acquire the information about the network route by performing an AND operation on bits of the additional gateway address and the IP address and constituting consecutive 1s as a subnet.

Alternatively, the route acquisition unit 420 may acquire information about a new network route in a subnet including one network route defined in the routing table and the IP address. In this case, the route acquisition unit 420 may acquire as much information about the new network route as the number of given network routes defined in the routing table. In this regard, the route acquisition unit 420 deletes a given network route since the new network route includes the given network route.

The user interface 10 provides the user with a network route by displaying the network route information acquired by the route acquisition unit 420. The user interface 10 receives a network route to be connected from the user. The routing table management unit 40 edits the routing table based on the network route received through the user interface 10.

In this regard, if a plurality of network routes are included in the acquired network route information, the user interface 10 may provide the user with the acquired network route information by arranging network routes according to the number of hosts included in each network route. That is, the user interface 10 displays the acquired network route information by arranging network routes based on priority in an ascending order of hosts or in a descending order thereof.

The storage unit 50 updates and stores the routing table based on the edited network settings.

FIG. 5 is a diagram for explaining a process of acquiring a network route in the route acquisition unit 420 according to an embodiment.

Referring to FIG. 5, a notebook 501 having an address 128.168.10.10 can be connected to the image forming apparatus 1 only through a gateway 192.1.20.1 of 'wireless0'. Thus, if 'eth0' is a default gateway, it is necessary to edit network settings of a routing table.

The connection control unit 410 attempts a connection through 'eth0' and 'wireless0' in order to transmit a document scanned in the image forming apparatus 1 to the notebook 501 having the address 128.168.10.10. Since 'eth0' having an address 191.1.10.11 is physically disconnected from 128.168.10.10, a ping test on 'eth0' fails, whereas, since 'wireless0' having an address 192.1.20.12 is connected to 128.168.10.10, a ping test on 'wireless0' succeeds. Thus, the route acquisition unit 420 acquires information about a gateway 192.1.20.1 of 'wireless0' with respect to a network route connectible to 128.168.10.10. In this regard, since 128.168.10.10 is an address of a C class, the route acquisition unit 420 may acquire a subnet 255.255.0.0 or a subnet 255.255.255.0.

FIG. 6 illustrates a screen in which a network route acquired by the route acquisition unit 420 is selected through the user interface 10 according to an embodiment.

Referring to FIG. 6, the route acquisition unit 420 acquires a network route of a destination 128.168.20.1 and a subnet 255.255.255.0, and another network route of a destination 128.168.0.0 and a subnet 255.255.0 as a result of acquiring a network route with respect to 'wireless0' having a gateway 192.1.20.1. The user interface 10 displays to a user the network route acquisition result, and receives a selection of the network route from the user.

Referring to FIG. 5, the image forming apparatus 1 includes two network interfaces like 'eth0' and 'wireless0', and thus users using the image forming apparatus 1 may be managed as two groups. That is, a network may be configured by classifying users as users connected by wire through 'eth0' and users connected wirelessly through 'wireless0'. In this case, the notebook 501 using 128.168.xxx.xxx may configure a network by allowing the image forming apparatus 1 to print a document and transmit a scanned document.

Figures 7, 8:
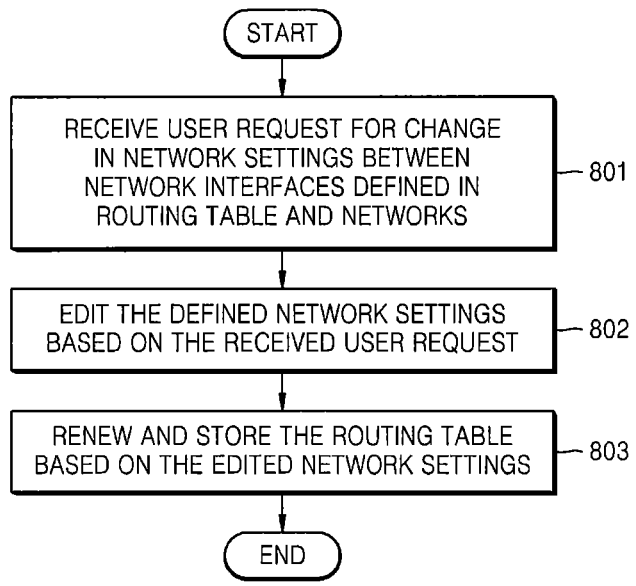
FIG. 7 illustrates a result obtained by adding a network setting to a routing table displayed on a user interface according to an embodiment.
FIG. 8 is a flowchart of a method of editing a routing table of an image forming apparatus according to an embodiment.

FIG. 7 illustrates a result obtained by adding a network setting 701 to a routing table displayed on the user interface 10 according to an embodiment.

Referring to FIG. 7, if a user request is a request for an addition of a network address, the network setting 701 is added to the routing table based on an editing process of the routing table management unit 40 described above.

FIG. 8 is a flowchart of a method of editing a routing table of an image forming apparatus according to an embodiment.

Referring to FIG. 8, the method of editing the routing table of the image forming apparatus of the present embodiment includes operations time-sequentially processed by the image forming apparatus 1 shown in FIGS. 1A, 1B, and 2. Accordingly, even if omitted hereinafter, the descriptions with reference to the figures may also be applied to the method of editing the routing table.

In operation 801, the user interface 10 receives a user request for a change in network settings between the first and second network interfaces 20 and 30 defined in the routing table and the network 2, 3, or 4.

In operation 802, the routing table management unit 40 edits the network settings based on the user request.

In operation 803, the storage unit 50 updates and stores the routing table based on the edited network settings.

According to an embodiment, a user can personally edit a routing table of an image forming apparatus through a user interface, and thus the user can intuitively manage a network setting more easily without a professional network manager's assistance.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

While the present general inventive concept has been particularly shown and described with reference to exemplary embodiments thereof using specific terms, the embodiments and terms have been used to explain the present general inventive concept and should not be construed as limiting the scope of the present general inventive concept defined by the claims. The preferred embodiments should be considered in a descriptive sense only and not for purposes of limitation. Therefore, the scope of the general inventive concept is defined not by the detailed description of the general inventive concept but by the appended claims, and all differences within the scope will be construed as being included in the present general inventive concept.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image forming apparatus to manage network connections to a plurality of network interfaces by using a routing table, the image forming apparatus comprising:
   a user interface to receive a user request for a change in network settings between networks and the plurality of network interfaces defined by the routing table, the received user request includes information on a new network address to be added to the routing table;
   a routing table management unit to attempt a connection to the new network address through the plurality of network interfaces and edit the defined network settings of the routing table with a network interface connectible to the new network address based on a result of the attempting the connection; and
   a storage unit to update and store the routing table based on the edited network settings,
   wherein the new network address does not exist in the routing table, and
   wherein the routing table management unit updates the routing table by mapping the new network address and a network interface connectable to the new network address.

2. The image forming apparatus of claim 1, wherein the user interface displays information about the network settings included in the routing table.

3. The image forming apparatus of claim 1, wherein the new network address comprises information about at least one of an Internet protocol (IP) address, a port number, and a communication protocol.

4. The image forming apparatus of claim 1, wherein the routing table management unit edits the defined network settings by mapping the network interface of the plurality of network interfaces connectible to the new network address.

5. The image forming apparatus of claim 4, wherein the connectible network interface is a default gateway corresponding to the new network address.

6. The image forming apparatus of claim 1, wherein the routing table management unit comprises:
   a connection control unit to attempt a connection to the new network address through the plurality of network interfaces; and
   a route acquisition unit to acquire information about a network route connectible to the new network address based on a result of the attempting the connection,
   wherein the routing table management unit edits the routing table based on the acquired information about the network route.

7. The image forming apparatus of claim 6, wherein the user interface receives a network route to be connected from a user after providing the user with the information about the network route,
   wherein the routing table management unit edits the routing table based on the network route.

8. The image forming apparatus of claim 6, wherein, if the information about the network route comprises a plurality of network routes, a user interface provides the user with the plurality of network routes by arranging the plurality of network routes according to a number of hosts to be included in each network route.

9. The image forming apparatus of claim 6, wherein the connection control unit attempts the connection to the new network address by using at least one of a ping test, a transmission control protocol(TCP)/IP test, a connection test according to a traceroute command, and a connection test based on a communication protocol with respect to each network interface.

10. The image forming apparatus of claim 1, wherein the received user request comprises a user request for a network setting to be corrected or deleted by a user with respect to the routing table.

11. An image forming apparatus for managing network connections to a plurality of network interfaces by using a routing table, the image forming apparatus comprising:
    a user interface to display network settings between networks and the plurality of network interfaces defined by the routing table, and receive a user request for a new network address to be added to the routing table;
    a routing table management unit to edit the defined network settings based on a result obtained by attempting a connection to the new network address through the plurality of network interfaces; and
    a storage unit to update and store the routing table based on the edited network settings,
    wherein the new network address does not exist in the routing table, and
    wherein the routing table management unit updates the routing table by mapping the new network address and a network interface connectable to the new network address.

12. A method of editing a routing table managing network connections to a plurality of network interfaces of an image forming apparatus, the method comprising:
    receiving a user request for a change in network settings between networks and the plurality of network interfaces defined by the routing table, the received user request includes information on a new network address to be added to the routing table;
    attempting, by a routing table management unit, a connection to the new network address through the plurality of network interfaces;
    editing, by the routing table management unit, the defined network settings based on a result of the attempting the connection; and
    updating the routing table based on the edited network settings,
    wherein the new network address does not exist in the routing table, and
    wherein the routing table management unit updates the routing table by mapping the new network address and a network interface connectable to the new network address.

13. The method of claim 12, further comprising: before receiving the user request, displaying information about the network settings included in the routing table.

14. The method of claim 12, wherein the editing of the defined network settings comprises: editing the defined network settings by mapping the network interface of the plurality of network interfaces connectible to the new network address.

15. The method of claim 12, wherein the editing of the defined network settings comprises:
    acquiring information about a network route connectible to the new network address based on the result of the attempting of the connection; and
    editing the routing table based on the acquired information about the network route.

16. The method of claim 15, further comprising:
  providing a user with the information about the network route through a user interface; and
  receiving the network route to be connected from the user through the user interface,
  wherein the editing of the defined network settings comprises editing the routing table based on the network route.

17. The method of claim 12, wherein the received user request comprises a user request for a network setting to be corrected or deleted by a user with respect to the routing table.

18. A non-transitory computer-readable recording medium storing a program to implement the method of claim 12.

19. A method of editing a routing table managing network connections to a plurality of network interfaces of an image forming apparatus, the method comprising:
  displaying network settings between networks and the plurality of network interfaces defined by the routing table;
  receiving a user request for a new network address to be added to the routing table;
  editing, by a routing table management unit, the defined network settings based on a result obtained by attempting a connection to the new network address through the plurality of network interfaces; and
  updating and storing the routing table based on the edited network settings,
  wherein the new network address does not exist in the routing table, and
  wherein the routing table management unit updates the routing table by mapping the new network address and a network interface connectable to the new network address.

20. A non-transitory computer-readable recording medium storing a program to implement the method of claim 19.

* * * * *

UNITED STATES PATENT AND TRADEMARK OFFICE
CERTIFICATE OF CORRECTION

| | | |
|---|---|---|
| PATENT NO. | : 9,041,956 B2 | Page 1 of 1 |
| APPLICATION NO. | : 13/531988 | |
| DATED | : May 26, 2015 | |
| INVENTOR(S) | : Yong-won Kwon | |

It is certified that error appears in the above-identified patent and that said Letters Patent is hereby corrected as shown below:

In the claims

Claim 8, Column 11, Line 64

Delete "a" and insert --the--, therefor.

Claim 8, Column 11, Line 64

Delete "the" and insert --a--, therefor.

Signed and Sealed this
Thirteenth Day of October, 2015

Michelle K. Lee
*Director of the United States Patent and Trademark Office*